United States Patent [19]

Balloni et al.

[11] Patent Number: 4,764,425
[45] Date of Patent: Aug. 16, 1988

[54] ORIENTED, HEAT SEALABLE MULTI-LAYERED FILM

[75] Inventors: Riccardo Balloni, Fairport; Jay Keung; David A. Liestman, both of Macedon; Michael Nahmias, Victor, all of N.Y.

[73] Assignee: Mobil Oil Corporation, New York, N.Y.

[21] Appl. No.: 12

[22] Filed: Jan. 2, 1987

[51] Int. Cl.$^4$ .......................... B32B 5/16; B32B 27/08
[52] U.S. Cl. ..................................... 428/331; 428/332; 428/349; 428/448; 428/451; 428/516; 264/176.1

[58] Field of Search ............... 428/347, 349, 516, 331, 428/451, 448, 332

[56] References Cited

U.S. PATENT DOCUMENTS 4,439,478  3/1984  Ferguson et al. ................... 428/516
4,595,625  6/1986  Crass et al. .......................... 428/516

Primary Examiner—P. C. Ives
Attorney, Agent, or Firm—Alexander J. McKillop; Michael G. Gilman; Howard M. Flournoy

[57] ABSTRACT

An oriented, heat-sealable polypropylene film is provided which possesses a low coefficient of friction, excellent anti-static behavior and good optical clarity.

25 Claims, No Drawings

ORIENTED, HEAT SEALABLE MULTI-LAYERED FILM

CROSS REFERENCE TO RELATED APPLICATIONS

Ser. No. 835,401, filed Mar. 3, 1986, now U.S. Pat. No. 4,654,252, entitled Good Machinability Film Structure and Method of Forming Same; Ser. No. 780,159, filed June 12, 1985, now U.S. Pat. No. 4,692,379, entitled Heat Sealable Film and Method for its Preparation; and Ser. No. 671,376, filed Nov. 14, 1984 entitled Oriented Multi-Layer Film, currently pending.

BACKGROUND OF THE INVENTION

This invention is directed to oriented heat sealable polyolefin film structures possessing a low film to film coefficient of friction, excellent anti-static behavior and good optical clarity. This invention is also directed to multi-layer film structures having improved appearance and machine handling in the packaging of diverse items of commerce.

Highly crystalline polypropylene film is an excellent packaging material, but it has high film to film coefficient of friction which makes it difficult to utilize in automatic packaging equipment. Certain innovations have improved on the surface friction characteristics of highly crystalline polypropylene in film form. For example, in U.S. Pat. No. 3,176,021, incorporated herein by reference, it is taught to include minor quantities of fatty acid amides into the polypropylene. In order to obtain the benefits taught by this patent, however, certain limitations must be observed. The film must be formed from a melt and extruded at a temperature between about 400°–550° F. In addition, the amide must be present in amounts of from 0.005 to about 2.0 weight percent of the polypropylene and it must be present along with from about 0.1 to about 4.0 weight percent polyethylene. Under these conditions and limitations the resulting polypropylene film has static coefficients of friction which are significantly higher than present day requirements. In addition, such a film does not have the high stereoregularity required by present day packaging demands. Further, it has been found that once such films have been subjected to the high temperatures which are experienced in practice such as during heat sealing, i.e., approaching 270° F., the coefficient of friction increases significantly and is nowhere near the present day requirements of about 0.25.

In U.S. Pat. No. 3,399,156, incorporated herein by reference, it is taught that the inclusion of the combination of silicone oil and finely divided silica into a polypropylene film produces a film which has a coefficient of friction of from 0.45 to 0.46 and is suitable for use in bread-wrapping machines. This is not a low enough coefficient of friction for use in present day, high speed automatic packaging machinery, however.

It has been found that to a certain extent high crystallinity in polypropylene impedes facile migration of additives to the surface of such a polymer in film form. This problem has been addressed in U.S. Pat. No. 4,419,410, incorporated herein by reference. This publication teaches that by the coextrusion of a skin layer of polypropylene of comparatively low stereoregularity with a core layer of polypropylene of comparatively high stereoregularity, containing a surface modifying agent such as an amide of a fatty acid, the amide will bloom to the surface of the layer having the comparatively low stereoregularity polymer with comparative ease.

U.S. Pat. No. 4,419,411, incorporated herein by reference in its entirety, significantly advanced the art of making multi-layer polypropylene films suitable for most high speed packaging operations. This patent discloses a multi-layer polypropylene film structure having surface modifying agents comprising finely divided silica, silicone oil and an amide of a water insoluble mono-carboxylic acid having from about 8 to about 24 carbon atoms on a surface thereof.

U.S. Pat. No. 4,590,125, incorporated by reference in its entirety, discloses a multi layer heat sealable polypropylene film structure comprising an amide-containing polypropylene base layer and two heat sealable skin layers of a low stereoregularity polyolefin and microcrystalline wax.

Nevertheless, despite the advances in film packaging technology as exemplified by the above referenced patents, their films suffered from one or more shortcomings. For example, some of the films, when used in high speed cigarette package wrapping machines, have a tendency for the film surfaces of contacting packages to stick together, particularly in areas where heat sealing has occurred.

It is an object of the present invention to provide an oriented, heat sealable polyolefin, preferably polypropylene film possessing a low coefficient of friction (COF), excellent anti-static properties and good optical clarity.

It is a further object to provide such films having a reduced tendency for the film surfaces to stick together when used in high speed packaging machinery, especially at locations where heat sealing has occurred.

It is another object to improve the aesthetic features of multi-layer films by improving uniformity and avoiding levels of additives which cause haze.

Yet another object is to secure improvements in the handling characteristics of films in accordance with the invention, to improve roll conformance and avoid film corrugation.

It is another object to provide a process for preparing multi-layer film structures in accordance with the invention.

These and other objects will be apparent from a review of the instant specification.

SUMMARY OF THE INVENTION

The objects of the invention are achieved by providing multi-layer film structures comprising a base layer comprising polypropylene containing an effective amount of suitable anti-static additives, at least one heat sealable layer consisting of a polyolefinic random copolymer or terpolymer and an effective amount of anti-blocking agent but being substantially devoid of silicone oil, and/or at least one heat sealable layer formed from a polyolefinic copolymer or terpolymer which is compounded with an effective amount of anti-blocking agent and silicone oil.

The invention is also directed to methods for preparing films by coextruding from a melt a laminar combination of base and heat sealable layers as described above. Preferably, the coextruded material is oriented by stretching either uni- or bi-axially or preferably, both.

The present invention is further directed to the improvement of the characteristics of a multi-layer film structure, the polyolefin base layer of which is preferably highly crystalline or highly stereoregular polypropylene in film form, which is preferably oriented film form. The preferred polypropylenes are well known in the art and are formed by polymerizing propylene in the presence of stereospecific catalyst systems. They can have a melt flow rate of 446° F. ranging from about 1 to about 25, preferably 1.5 to 8 and even more preferably from about 1.5 to about 5. The crystalline melting point is about 321°-325° F. The number average molecular weight ranges from about 25,000 to about 100,000, while the density ranges from about 0.90 to 0.91.

DESCRIPTION OF PREFERRED EMBODIMENTS

In accordance with the present invention, there is provided an oriented, heat sealable polypropylene film possessing a low coefficient of friction, excellent antistatic behavior and good optical clarity which comprises:

(a) At least one heat sealable layer (a) consisting of ethylene-propylene random copolymer and/or ethylene-propylene butene-1 terpolymer being compounded with an effective amount of anti-blocking agent, and substantially devoid of silicone oil. This layer is treated by conventional means (e.g., corona discharge, flame or chemical treatment) and the exposed surface of this treated layer (a) is coated with a coefficient of friction reducing amount of silicone oil transferred to said surface through contact silicone oil containing heat sealable layer (c).

(b) A core layer derived from isotactic polypropylene containing effective amounts of anti-static agents, e.g., tertiary amines and glycerides.

(c) At least one heat sealable (c) layer formed from a group consisting of ethylene-propylene random copolymers and/or ethylene-propylene butene-1 terpolymers. Said polymers being compounded with an effective amount of anti-blocking agent and a quantity of silicone oil such that low coefficient of friction is maintained on (c) layer as well as the exposed surface of layer (a) following mutual contact of said surfaces.

Materials used in this ABC structure are dissimilar in composition. This invention has the following advantages:

(1) Both layers (a) and (c) are heat sealable and exhibit exceptional COF (0.25-0.30).

(2) The combination of tertiary amines and glycerides, e.g., cocoamine, N,N bis (2-hydroxyethyl) stearylamine and glycerol monosterates produces anti-static surfaces that are resistant to dust pick up. Suitable amines include di or mono-tertiary amines. It is noted that this invention is not limited to the described ABC structure but also includes the following modifications: (1) AB comprising said core layer containing an effective amount of silicone oil and a heat sealable layer as described substantially devoid of silicone oil and (2) BC comprising said core layer with a treated surface and a heat sealable layer as described containing an effective amount of silicone oil.

The polyolefins of comparatively low stereoregularity contemplated as comprising the skin materials of the multi-layer structures are as noted above preferably random copolymers of ethylene and propylene and/or ethylene-propylene- butene-1 terpolymers. Particularly preferred are ethylene-propylene-butene-1 terpolymers which contain from about 2 to about 9 wt. % and, more preferably, from about 3% to about 5% by weight of ethylene; 2 to 9 wt. %, preferably 3 to about 7% by weight of 1-butene. Suitable polymers generally have a melt flow rate of 446° F. ranging from about 2 to 15 and preferably 3 to 8. The crystalline melting point is about 245° to 302° F. The number average molecular weight range is from about 25,000 to about 100,000. The density ranges from about 0.89 to 0.90. These terpolymers have excellent heat seal characteristics. They do not, however, have the excellent physical characteristics inherent in the polypropylene of comparatively high stereoregularity. Thus the base material polypropylene of high stereoregularity possesses the excellent characteristics of good moisture barrier quality, stiffness, high strength and optical properties. While the thin coextruded surface layers of the comparatively low stereoregular terpolymers provide excellent heat seal characteristics, to take advantage of these characteristics the skin layers must be modified so as to exhibit the characteristics of good slip and the tendency not to stick to an adjacent film region after being exposed to heat-seal temperatures. At the same time it is desired to avoid additions of amounts of additives which lead to non-uniformity and haze.

The overall thickness of the contemplated multi-layer structure is due primarily to the highly stereoregular polypropylene base layer. The coextruded skin layers of comparatively low stereoregularity are present on both surfaces of the base layer. It is preferred that the skin layers have thicknesses of less than about 0.8 microns. So long as the continuity of the film structure is maintained, the minimum thicknesses of the skin layers are not important. Present day techniques will easily permit film thicknesses of about 0.3 microns or less.

The finely divided anti-blocking agent preferred for inclusion in the heat sealable skin layers may be any particulate inorganic material, preferably having a mean particle size ranging from about 0.5 to 5 microns. One commercially available silica has a mean particle size of 0.75 microns and another has a mean particle size of 4.5 microns. Materials having either particle size or particle sizes within this range can be employed. Metal silicates, glasses, clays and numerous other finely comminuted inorganic materials may also be used. The anti-blocking agent is preferably present in amounts from about 0.05 to 0.5 wt. %, preferably about 0.1 to 0.3 wt. % of each of the skin layers.

An important component of the herein embodied multilayer film structure is the silicone oil. The silicone oil is incorporated into one of the heat sealable layers in an amount such that low coefficient of friction is maintained on the layer into which it is incorporated and the exposed surface of the other heat sealable layer following contact of their surfaces. The silicone oil is preferably added in amounts between about 0.5% to about 3.0% by weight of the heat sealable skin layer containing same and up to about 5% by weight but preferably 1.1 to 1.5 wt. %.

An optional additive for inclusion in the core layers is a glycerol or glyceride which may when used preferably be included in amounts between about 0.05 and 0.3% by weight of the layer and most preferably at about 0.1% by weight. The core layer also contains effective amounts of other suitable anti-static agents. The anti-static agents compounded with the core layer include but are not limited to tertiary amines and glycerides. Examples of tertiary amines are N,N-bis (2-hydroxyethyl) alkenyl or mixed alkenyl amines and alkyl $C_6$–$C_{18}$ coco and tallow amines. The preferred amine is N,N bis (2 hydroxyethyl) stearylamine or a mixture of amines containing same.

The multi-layer films of the present invention can be prepared employing commercially available systems for coextruding resins. A polypropylene homopolymer of comparatively high stereoregularity is preferably coextruded with an ethylene-propylene random copolymer of comparatively low stereoregularity containing the appropriate percentage of known optional components such as wax and anti-blocking agent. The polymers can be brought to the molten state and coextruded from a conventional extruder through a flat sheet die, the melt streams being combined in an adapter prior to being extruded from the die. After leaving the die orifice, the multi-layer film structure is chilled and the quenched sheet then preferably reheated and stretched, e.g., 4 to 6 times in the machine direction and subsequently, for example, 4 to 10 times in the transverse direction. The edges of the film can be trimmed and the film wound onto a core.

It is preferred that the thus-formed structure be conditioned or equilibrated by holding the same for a period of about 6 hours to 1 week at a temperature from about 80° to about 125° F. The resulting film will have a coefficient of friction (COF) of 0.30 or lower, preferably about 0.25 or less, and will not block under conditions of tight winding after being held at temperatures up to 140° F. or more. Each heat sealable layer will usually have a COF of from about 0.10 to about 0.40 and preferably from about 0.20 to about 0.30.

A commercially available base homopolymer and skin polymers and their approximate at least melting points are tabulated in the table below:

TABLE

| Polymeric Material | | Melting Point Range |
|---|---|---|
| Homopolypropylenes | | 321°-325° F. |
| A | (ethylene-propylene random copolymer 3.3-3.6 wt. % ethylene) | 273° F. |
| B | (ethylene-propylene random copolymer 4-8 wt. % ethylene) | 255° F. |
| C | (ethylene-propylene-butene-1 terpolymers, 4-5½ wt. % ethylene, 3.5-6 wt. % butene-1) | 250° F. |
| D | (ethylene-propylene random copolymer) | 270° F. |
| E | (ethylene-propylene random copolymer 3.4-4.0 wt. % ethylene) | 270° F. |
| F | (ethylene-propylene random copolymer, 4-6 % ethylene) | 255° F. |

Coefficients of friction (COF) or slip may be determined by the "moving slide-stationary film" method of U.S. Pat. No. 3,399,156, incorporated herein by reference.

The contemplated films can be tested by feeding a roll of film into a packaging machine of either the vertical or horizontal type. These machines are equipped with high precision controllers. During transport through the machine each package is subjected to three heat seal regions which can cause package to package stick and drag. The heat seal time is a fraction of a second. The film must maintain a COF at room temperature of between about 0.2-0.3, usually about 0.25 in order to avoid unacceptable drag which would lead to pack jamming and machine down-time. Success of the operation depends on the virtual absence of pack-to-pack stick and drag, a moderate to low force necessary to move the packs through the system and a seal range of at least 40° F., preferably 70°-90° F. on all seal surfaces.

This invention is further elaborated by the following, non-limiting examples:

EXAMPLE 1

A polypropylene homopolymer of high stereoregularity containing about 1000 ppm of N,N-bis (2-hydroxyethyl) coco amine, 1000 ppm of N,N-bis (2-hydroxyethyl) stearyl amine, 500 ppm glycerol monostearates is melted and coextruded with 2 skin layers comprising:

(a) A top layer of ethylene-propylene butene-1 terpolymer, about 0.3% silica anti-blocking agent.

(b) A bottom layer of ethylene-propylene butene-1 terpolymer consisting of 1.2% silicone fluid and 0.2% silica anti-blocking agent. The coextrudate was quenched 80°-110° F., reheated to 240°-280° F. and stretched in the machine direction 4-10 times, using transport rolls operating at different speeds. After the desired MD orientation, the film is transversely direction oriented, at an appropriate temperature profile, in a tenter frame.

The homopolymer polypropylene has a melt flow about 4 and a DSC melting point about 160° C. The resulting film has an overall thickness of 21 microns with the core layer 19.8 microns and skin layers being 0.6 microns each. Subsequently, the top layer is corona treated and the film is wound in a mill roll form.

On a vertical type packaging system samples of this film run well at 22 packages per minute; at higher speeds on newer systems up to 70 packages per minute are possible. On a horizontal system samples of this film run well at 170 packages per minute.

Samples tested show 0.25-0.30 COF on top and bottom substrates, good static half life behavior and do not register dust pick up. The above described film is further tested by a Scandia cigarette packaging machine running at 172 packs per minute. Wrapping can be successfully accomplished with a virtual absence of package to package sticking. A moderate-to-low force will be necessary to move the package through the machine system.

EXAMPLE 2

Example 1 was repeated except that the core resin is non-additive containing 100% stereoregular homopolymer polypropylene. That is, the core resin does not contain any tertiary amines or glycerol monostearates.

On both vertical and horizontal packaging systems, examples show acceptable machinability.

Scandia machinability tests show acceptable performance, but the static-behavior on packages is poor.

EXAMPLE 3

Example 1 was repeated except that the top (a) layer is identical in composition to that of layer (c), i.e., both layers contain silicone oil. Testings show the heat sealability capability of layer (a) is essentially destroyed and the film is not acceptable for vertical, horizontal or Scandia wrapping applications.

EXAMPLE 4

Example 1 was repeated except that anti-blocking agent silica is excluded in layer (a). Employing the resulting film in the same horizontal, vertical or Scandia type wrapping system, the system jams in less than one minute due to poor COF characteristics.

EXAMPLE 5

Example 1 was repeated except that the core resin contained 1000 ppm N,N-bis (2 hydroxyethyl) coco amine only. Testing samples of this film on vertical, horizontal or Scandia type packaging systems shows acceptable performance, and dust pick up is negligible.

Examples 1 and 5 are compositions in accordance with this invention, while Examples 2 through 4 are comparative examples.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A multi-layer film structure comprising coextruded, oriented heat sealable film comprising:
   (a) at least one heat sealable layer consisting of a random copolymer and/or a terpolymer compounded with an effective amount of a finely divided anti-blocking agent comprising particulate inorganic materials having mean particle sizes from about 0.5 to about 5 microns present in amounts from about 0.05% to about 0.5% by weight of the heat sealable layer but substantially devoid of silicone oil, the exposed suface of which is thereafter treated with a coefficient of friction reducing amount of silicone oil transferred thereto through contact of said exposed surface with a silicone oil containing heat sealable layer;
   (b) a core layer derived from isotactic polypropylene containing an effective amount of an anti-static agent comprising a suitable tertiary amine and/or a glyceride selected from the group consisting glyercol monostearate and/or a mixture of said amine and said glyercide and /or;
   (c) at least one heat sealable layer derived from a group consisting of random copolymers and/or terpolymers, said polymers being compounded with an effective amount of said anti-blocking agent and an amount of silicone oil sufficient to maintain a low coefficient of friction on layer (c) and also on the exposed surface of layer (a) following mutual contact of said surfaces whereby said film possesses a low coefficient of friction, excellent anti-static behavior and good optical clarity in comparison to film structures not having the described heat sealable layers in combination with the described additive materials.

2. The structure of claim 1 wherein said copolymers are either the same or different random copolymers of ethylene and propylene and said terpolymers are either the same or different terpolymers of ethylene, propylene and butene-1.

3. The structure of claim 2 wherein the copolymers of ethylene and propylene independently contain from about 2 to about 9% by weight of ethylene.

4. The structure of claim 2 wherein the terpolymers of ethylene, propylene and butene-1 independently contain from about 2 to about 7% by weight of ethylene and from about 4 to about 5% by weight of butene-1.

5. The structure of claim 1 wherein said anti-blocking agent is silica.

6. The structure as claim 1 wherein the tertiary amines of core layer (b) are selected from the group consisting of alkyl coco and tallow amines, N,N bis (2-hydroxyethyl) alkenyl or mixed alkenyl amine or mixtures thereof.

7. The structure of claim 6 wherein said amine is N,N bis (2-hydroxyethyl) stearylamine.

8. The structure of claim 7 wherein the core layer (b) further comprises anti-static amounts of a mixture comprising said stearyl amine, cocoamine and a glycerol monosterate.

9. The structure of claim 1 wherein heat sealable layers (a) and (c) each have a coefficient of friction varying from about 0.10 to about 0.40.

10. The structure of claim 9 wherein heat sealable layers (a) and (c) have a coefficient of friction varying from about 0.20 to about 0.30.

11. The structure of claim 1 wherein layer (c) contains from about 0.5 to about 3.0% by weight of silicone oil.

12. The structure of claim 10 wherein said layer (c) contains about 1.1 to 1.5% by weight of silicone oil.

13. The structure of claim 1 wherein each of the heat sealable layers is sealable both to itself and to the other heat sealable layer.

14. The structure of claim 1 wherein said heat sealable layer substantially devoid of silicone oil is subject to treatment to enhance surface properties.

15. The structure of claim 14 wherein the treatment means include corona discharge, chemical or flame treatment.

16. A multi-layer film structure comprising coextruded, oriented heat sealable film comprising:
   (a) at least one heat sealable layer consisting of a random copolymer and/or a terpolymer compounded with an effective amount of a finely divided anti-blocking agent comprising particulate inorganic materials having mean particle sizes from about 0.5 to about 5 microns and is present in amounts from about 0.05% to about 0.5% by weight of said heat sealable layer but substantially devoid of silicone oil, the exposed suface of which is thereafter treated with a coefficient of friction reducing amount of silicone oil transferred thereto through contact of said exposed surface with a silicone oil containing heat sealable layer;
   (b) a core layer derived from isotactic polypropylene containing an effective amount of an anti-static additive comprising a suitable teritary amine and being compounded with an effective amount of an anti-blocking agent and an amount of silicone oil sufficient to maintain a low coefficient of friction on layer (b) and also on the exposed surface of layer (a) following mutual contact of said surfaces.

17. The structure of claim 16 wherein said copolymer is a random copolymer of ethylene and propylene and said terpolymer is a terpolymer of ethylene, propylene and butene-1.

18. The structure of claim 17 wherein the copolymer of ethylene and propylene contain from about 2 to about 9% by weight of ethylene.

19. The structure of claim 17 wherein said terpolymer contains from about 2 to about 7 wt. % ethylene and from about 4 to about 5 wt. % butene-1.

20. The structure of claim 16 wherein said core layer is homopolypropylene.

21. A multi-layer film structure comprising coextruded, oriented heat sealable film comprising:
   (a) a core layer derived from isotactic polypropylene containing an effective amount of an anti-static agent comprising a suitable tertiary amine and/or a glyceride selected from the group consisting glyercol monostearate, and/or a mixture of said amine and said glyercide and /or;

(b) at least one heat sealable layer derived from a group consisting of random copolymers and/or terpolymers, said polymers being compounded with an effective amount of said anti-blocking agent whereby said film possesses a low coefficient of friction, excellent anti-static behavior and good optical clarity in comparison to film structures not having the described heat sealable layers in combination with the described additive materials and an amount of silicone oil sufficient to maintain a low coefficient of friction on layer (c) and also on the exposed surface of ayer (a) following mutual contact of said surfaces.

22. The structure of claim 21 wherein said copolymer is a random copolymer of ethylene and propylene and said terpolymer is a terpolymer of ethylene, propylene and butene-1.

23. The structure of claim 22 wherein the copolymer of ethylene and propylene contain from about 2 to about 7% by weight of ethylene.

24. The structure of claim 22 wherein said terpolymer contains from about 2 to about 7 wt. % ethylene and from about 4 to about 5 wt. % butene-1.

25. The structure of claim 21 wherein said core layer is homopolypropylene.

* * * * *